J. D. KENNEDY.
DEMOUNTABLE RIM.
APPLICATION FILED FEB. 3, 1912.
1,064,342.
Patented June 10, 1913.
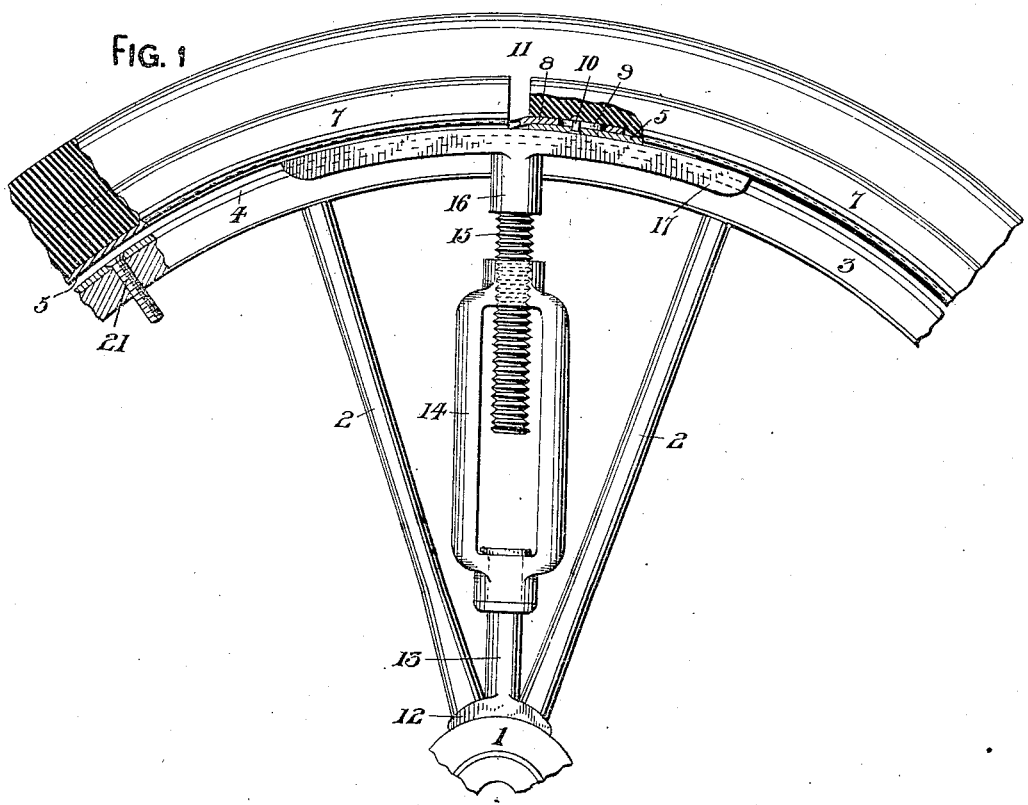
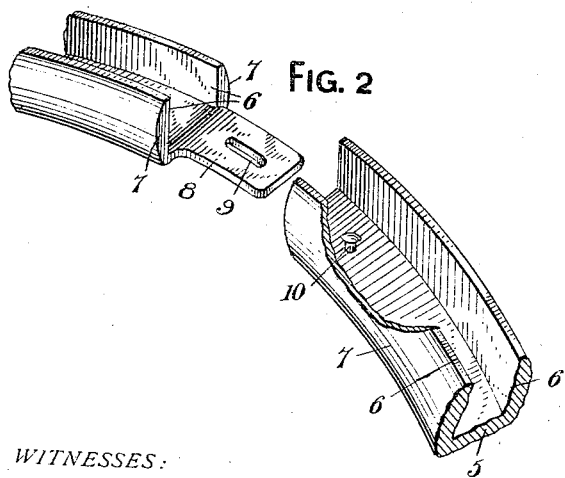
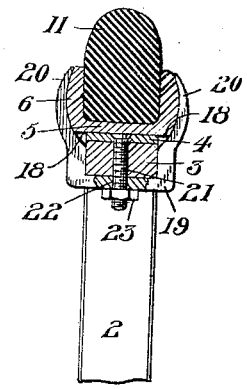
WITNESSES:
INVENTOR.
John D. Kennedy
BY
ATTORNEYS

UNITED STATES PATENT OFFICE.

JOHN D. KENNEDY, OF NEW KENSINGTON, PENNSYLVANIA.

DEMOUNTABLE RIM.

1,064,342.

Specification of Letters Patent.

Patented June 10, 1913.

Application filed February 3, 1912. Serial No. 675,308.

*To all whom it may concern:*

Be it known that I, JOHN D. KENNEDY, a citizen of the United States of America, residing at New Kensington, in the county of Westmoreland and State of Pennsylvania, have invented certain new and useful Improvements in Demountable Rims, of which the following is a specification, reference being had therein to the accompanying drawing.

This invention relates to detachable tires for vehicle wheels, and the primary object of my invention is the provision of novel means for converting a wheel having a metallic tire into a wheel having a resilient tire, whereby a wheel that is ordinarily used for drayage purposes can be used in connection with a pleasure vehicle, as a carriage.

Another object of this invention is to provide a demountable resilient tire holder or rim that can be easily and quickly placed in position upon the tire of an ordinary wheel and positively retained thereon, the demountable resilient tire being secured in a manner that adds strength and rigidity to the wheel upon which it is mounted.

A further object of this invention is to provide a demountable resilient tire for wheels consisting of comparatively few parts, inexpensive to manufacture, easy to install and highly efficient for the purposes for which they are intended.

These and such other objects in view as may hereinafter appear are attained by a mechanical construction that will be hereinafter specifically described and then claimed.

Reference will now be had to the drawing, wherein:—

Figure 1 is a side elevation of a portion of the wheel partly broken away and partly in section, Fig. 2 is a perspective view of the confronting ends of the resilient tire holder, and Fig. 3 is a cross sectional view of a portion of a wheel provided with the tire holder.

The reference numeral 1 denotes a portion of a hub having spokes 2, a felly 3 and a metallic rim or tire 4, these elements constituting the ordinary type of wheel.

The demountable rim comprises a metallic channel-shaped holder having a flat bottom 5 and the side walls 6 thereof provided with enlargements or reinforcements 7 to add rigidity to the side walls without impairing the resiliency of the demountable rim. The demountable rim which when in operative position is arranged circumferentially of the wheel rim 4 and one end of the demountable rim has the walls thereof cut away and the bottom thereof bent to provide a raised tongue 8 which is adapted to fit between the side walls 6 of the opposite end of the demountable rim and rest upon the bottom of the said rim 5. The tongue 8 is provided with a longitudinal slot 9 and said tongue is retained in engagement with the opposite end of the demountable rim by a rivet 10 extending through the slot 9. The head of the rivet is flattened after the tongue 8 is placed in position, and it is by virtue of the slot 9 that the ends of the demountable rim can shift, as will presently appear. Mounted in the demountable rim 5 and frictionally held therein is a resilient tire 11, preferably made of solid rubber, said tire projecting above the side walls 6 of the demountable rim.

To clamp the demountable rim upon the wheel rim 4, a specially designed instrument is employed to expand the demountable rim at the confronting ends thereof. The instrument is constructed upon the principle of a turn buckle and comprises a hub head 12 having a shank 13 for a rotatable buckle 14. Adjustably mounted in the upper end of the buckle is a screw 15 carried by the shank 16 of a holder head 17. The heads 12 and 17 are segment-shaped to conform to the curvature of the hub 1 and the holder 5, and the demountable rim, and the head 17 is made of thin plate, whereby it can engage either of the shoulders 18 formed by making the holder 5 of a greater width than the rim 4, as best shown in Fig. 3 of the drawing. When the ends of the demountable rim are forced apart by the turn buckle, the remaining portions of the demountable rim are clamped upon the rim 4. The movement between the ends of the demountable rim is very slight, but it is sufficient to cause the demountable rim to frictionally engage the rim. To further clamp the demountable rim upon the rim 4, a plurality of U-shaped clips or clamping members 19 are employed and equally spaced throughout the circumference of the wheel. The clips 19 are adapted to embrace the felly 3 of the wheel and said clips have resilient arms 20 adapted to be sprung into engagement with the walls 6 of the demountable rim. To retain the clips in position the ordinary stay bolts 21 of the wheel are employed, these stay bolts retaining the rim 4 upon the felly and in order that the bolts can be used for holding the clips, said bolts are made of greater length whereby they will extend through openings 22 provided therefor in the clips and receive nuts 23. After the clips are placed in position, the turn buckle employed for expanding the demountable rim can be removed.

The resiliency of the demountable rim is sufficient to retain the demountable rim in position upon the rim 4 until the expanding tool is placed in position to clamp the demountable rim upon the rim, and the expanding tool retains the demountable rim in position until the clips are mounted upon the felly of the wheel to engage the demountable rim.

To remove the demountable rim it is only necessary to remove the nuts 23. When the clips 19 are released the demountable rim retracts and can be easily removed from the wheel rim.

It is apparent from the foregoing that the resilient metallic demountable rim will add strength and rigidity to the wheel when clamped to the wheel rim 4, and that sufficient rubber is used in the tire 11 to insure a cushioning of the wheel when in motion.

It is to be understood that the invention is susceptible to such variations and modifications as fall within the scope of the appended claim.

What I claim is:—

A demountable rim comprising a split channel-shaped member having squared ends and adapted to receive a resilient tire and further adapted to be detachably positioned circumferentially with respect to a wheel rim, a tongue formed integral with and projecting from one end of the bottom of said member, said tongue offset outwardly with respect to the outer face of said bottom and adapted to project upon the outer face of the bottom of said member at the other end thereof, said tongue provided at its free end with a longitudinal slot, and an outwardly projecting headed stud carried by that end of the bottom of the free end of the tongue and extending through the slot for connecting the ends of the member together, one end wall of said slot limiting the movement of the ends of the member away from each other.

In testimony whereof I affix my signature in the presence of two witnesses.

JOHN D. KENNEDY.

Witnesses:
MAX H. SROLOVITZ,
CHRISTINA T. HOOD.

---

Copies of this patent may be obtained for five cents each, by addressing the "Commissioner of Patents, Washington, D. C."